(12) United States Patent
Lingambudi et al.

(10) Patent No.: US 11,237,606 B2
(45) Date of Patent: Feb. 1, 2022

(54) SYSTEM PARAMETER TRACE AND TEST COVERAGE OPTIMIZATION IN A COMPUTER SYSTEM

(71) Applicant: International Business Machines Corporation, Armonk, NY (US)

(72) Inventors: Anil Bindu Lingambudi, Bangalore (IN); Diyanesh B. Chinnakkonda Vidyapoornachary, Bangalore (IN); Saurabh Chadha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/296,648

(22) Filed: Mar. 8, 2019

(65) Prior Publication Data

US 2020/0285288 A1 Sep. 10, 2020

(51) Int. Cl.
*G06F 1/24* (2006.01)
*G06F 11/30* (2006.01)
*G06F 11/34* (2006.01)
*G06F 9/4401* (2018.01)

(52) U.S. Cl.
CPC ............ *G06F 1/24* (2013.01); *G06F 11/3024* (2013.01); *G06F 11/3495* (2013.01); *G06F 9/4401* (2013.01)

(58) Field of Classification Search
None
See application file for complete search history.

(56) References Cited

U.S. PATENT DOCUMENTS

| 6,505,249 | B1 | | 1/2003 | Rehkopf | |
|---|---|---|---|---|---|
| 9,195,807 | B1 | * | 11/2015 | Klein | G06F 21/105 |
| 9,396,160 | B1 | | 7/2016 | Aithal et al. | |
| 10,990,709 | B2 | * | 4/2021 | Robison | G06F 21/572 |
| 2007/0276795 | A1 | * | 11/2007 | Poulsen | G06Q 90/00 |
| 2016/0224381 | A1 | * | 8/2016 | Farhan | G06F 9/5044 |
| 2016/0246510 | A1 | * | 8/2016 | Rothman | G06F 9/44505 |
| 2019/0095195 | A1 | * | 3/2019 | Lin | G06F 9/4406 |

* cited by examiner

*Primary Examiner* — Fahmida Rahman
(74) *Attorney, Agent, or Firm* — Patterson + Sheridan, LLP

(57) ABSTRACT

In an example, a computer system includes: a hardware platform including a processor, system memory, and a plurality of input/output (IO) devices, the processor including a controller having a trace and optimize function controller (TOF); and a software platform including an operating system (OS) executing on the hardware platform; wherein the TOF is configured to communicate with the processor, the system memory, and the plurality of IO devices to obtain current settings thereof and to determine final settings for the processor, the system memory, and the plurality of IO devices based on the current settings; and wherein the controller is configured to control the processor, the system memory, and the plurality of IO devices based on the final settings.

20 Claims, 4 Drawing Sheets

SYSTEM PARAMETER TRACE AND TEST COVERAGE OPTIMIZATION IN A COMPUTER SYSTEM

BACKGROUND

The present invention relates to computer systems, and more specifically, to tracing system parameters and optimizing test coverage in a computer system.

Computer systems include various software and hardware components for controlling power, performance, and thermal characteristics. While some components may be in communication, other components may be "out-of-band." Such out-of-band components control some settings independent of other components. This can lead to a scenario where an out-of-band component attempts to control a particular setting for a given test purpose, while other component(s) override the setting in an undesirable manner during the testing. Further, particular settings for testing one component are not necessarily optimal for testing another component. For example, memory characterization settings do not guarantee optimal settings for processor and IO. Processor characterization settings do not guarantee optimal settings for memory and IO. IO characterization settings do not guarantee optimal settings for processor and memory. This leads to a multi-dimensional engineering problem of assuring desirable margin levels of interfaces, circuits, subsystems, and at a system level, in light of workloads, including but not limited to packaging, electrical, and thermal aspects.

SUMMARY

According to one embodiment of the present invention, a computer system includes: a hardware platform including a processor, system memory, and a plurality of input/output (IO) devices, the processor including a controller having a trace and optimize function controller (TOF); and a software platform including an operating system (OS) executing on the hardware platform; wherein the TOF is configured to communicate with the processor, the system memory, and the plurality of IO devices to obtain current settings thereof and to determine final settings for the processor, the system memory, and the plurality of IO devices based on the current settings; and wherein the controller is configured to control the processor, the system memory, and the plurality of IO devices based on the final settings.

In another embodiment, a method of controlling devices in a computer system, the computer system including a hardware platform including a processor, system memory, and a plurality of input/output (IO) devices, the processor including a controller having a trace and optimize function controller (TOF), the method including: communicating, by a trace and optimize function controller (TOF) in the controller, with the processor, the system memory, and the plurality of IO devices to obtain current settings thereof; determining, by the TOF, final settings for the processor, the system memory, and the plurality of IO devices based on the current settings; and controlling, by the controller, the processor, the system memory, and the plurality of IO devices based on the final settings.

In another embodiment, a computer program product for controlling devices in a computer system, the computer system including a hardware platform including a processor, system memory, and a plurality of input/output (IO) devices, the processor including a controller having a trace and optimize function controller (TOF), the computer program product including: a computer-readable storage medium having computer-readable program code embodied therewith, the computer-readable program code executable by one or more computer processors to: communicate, by a trace and optimize function controller (TOF) in the controller, with the processor, the system memory, and the plurality of IO devices to obtain current settings thereof; determine, by the TOF, final settings for the processor, the system memory, and the plurality of IO devices based on the current settings; and control, by the controller, the processor, the system memory, and the plurality of IO devices based on the final settings.

DETAILED DESCRIPTION

Figure 1:
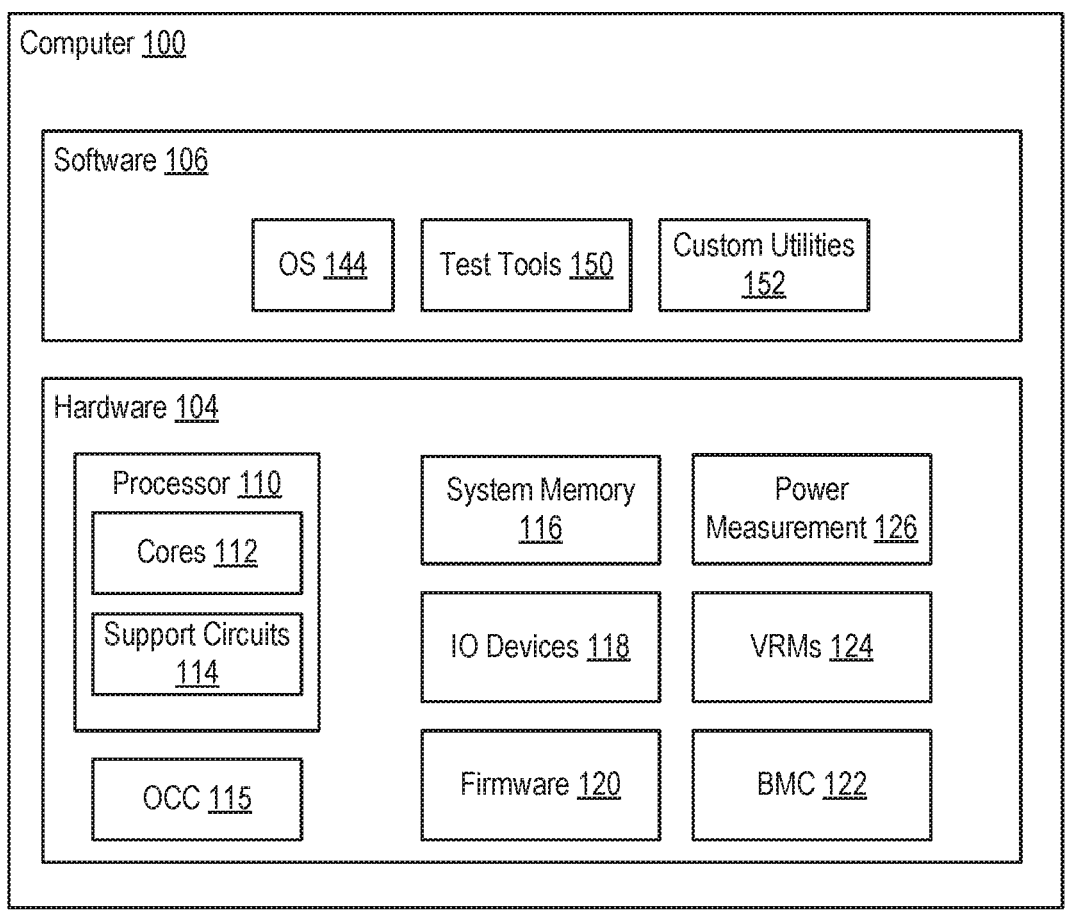
FIG. 1 is a block diagram depicting a computer according to an example.

FIG. 1 is a block diagram depicting a computer 100 according to an example. The computer 100 includes a hardware platform ("hardware 104") and a software platform ("software 106") executing on the hardware 104. The hardware 104 includes a processor 110, an on-chip controller (OCC) 115, system memory 116, input/output (IO) storage devices 118, firmware 120, power measurement device(s) ("power measurement 126"), voltage regulation modules (VRMs) 124, and a baseboard management controller (BMC) 122. The software 106 includes an operating system (OS) 144, test tools 150, and custom utilities 152. In an embodiment, the OCC 115 is separate from the processor 110 as shown in FIG. 1. In another embodiment, the OCC 115 may be part of the processor 110.

The processor 110 includes one or more microprocessor cores ("cores 112") and support circuits 114. The cores 112 can be any type of general-purpose central processing unit (CPU), such as an IBM POWER-based processor, an x86-based processor, ARM-based processor, or the like. The cores 112 can include associated circuitry (e.g., cache memories, memory management units (MMUs), interrupt controllers, etc.). The cores 112 are configured to execute program code that can perform one or more operations described herein and which can be stored in the system memory 116. The support circuits 114 include various devices that cooperate with the cores 112 to manage data flow between the cores 112, the system memory 116, the IO devices 118, or any other peripheral device. For example, the support circuits 114 can include a north bridge, south bridge, platform host controller, peripheral bus, and the like. In some examples, all or a substantial portion of the functionality of the chipset (e.g., north bridge, south bridge, etc.) can be disposed in a separate integrated circuit (IC) within the hardware 104.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The IO devices 118 can include any type of peripheral device, such as network interface cards (NICs) and local storage devices (e.g., one or more hard disks, flash memory modules, solid state disks, and optical disks) and/or a storage interface that enables the computer 100 to communicate with one or more network data storage systems. The hardware 104 can include various other conventional devices and peripherals of a computing system, such as graphics cards, universal serial bus (USB) interfaces, and the like.

The firmware 120 can be stored in a non-volatile memory (NVM) or any type of non-volatile storage device. The firmware 120 can include various functions, such as code for initializing devices (e.g., the processor 110, the system memory 116, etc.), booting the OS 144, and the like, as well as one or more interfaces for controlling and configuring some or all of the functions (e.g., a Unified Extensible Firmware Interface (UEFI) or the like). The power measurement 126 is configured to monitor and report on power consumption of various devices in the computer 100 (e.g., the processor 110, the system memory 116, the IO devices 118, etc.). The VRMs 124 comprise voltage regulators and the like for regulating and controlling voltage of various rails in the computer 110 used by the processor 110, the system memory 116, and the IO devices 118. The BMC 122 is configured to perform various management functions, such as turning system power rails on and off, booting the computer 100, providing access to the firmware 120, setting fan speeds, powering off the computer 100 in response to over-temperature or other potentially catastrophic events, and the like. The OCC 115 is configured to monitor and control system power, chip temperatures, and the like.

The OS 144 can be any commodity operating system known in the art, such as such as LINUX, Microsoft Windows®, Mac OS®, or the like. The test tools 150 are configured for testing various devices in the computer 100, such as processor 110, the system memory 116, the IO devices 118, and the like. The custom utilities 152 are configured to control some characteristics of the computer 100, such as a custom utility for controlling the voltage used by the processor 110, the voltage used by the system memory 116, the voltage used by an IO device 118, or the like.

In operation, the OCC 115 reads and controls system power and integrated circuit (IC) temperatures. The OCC 115 provides for power capping, fault tolerance, energy saving, and performance boosts. The OCC 115 communicates with the BMC 122 and the OS 144 to obtain user settings, and communicates with various devices in the system for control.

One of more of the custom utilities 152 can control various devices in the system out-of-band with respect to the OCC 115 (e.g., without updating or communicating with the OCC 115). For example, one of the custom utilities 152 can be configured to slew the voltage rails of the processor 110 and the system memory 116 (e.g., used during memory characterization). Although the custom utilities 152 are shown as part of the software platform 106, one or more of the custom utilities 152 can be part of the firmware 120. Further, one or more of the custom utilities 152 can be executed prior to booting of the OS 144. After booting of the OS 144, one or more test tools 150 may be executed to continue testing. Over time, the OCC 115 begins controlling processor and memory voltages, disturbing the settings of the custom utility. As such, the test tools 150 perform tests with an unintended setting of the processor/memory voltage.

In an embodiment, such a scenario is avoided by the OCC 115, which includes a trace and optimize function as described further herein.

Figure 2:
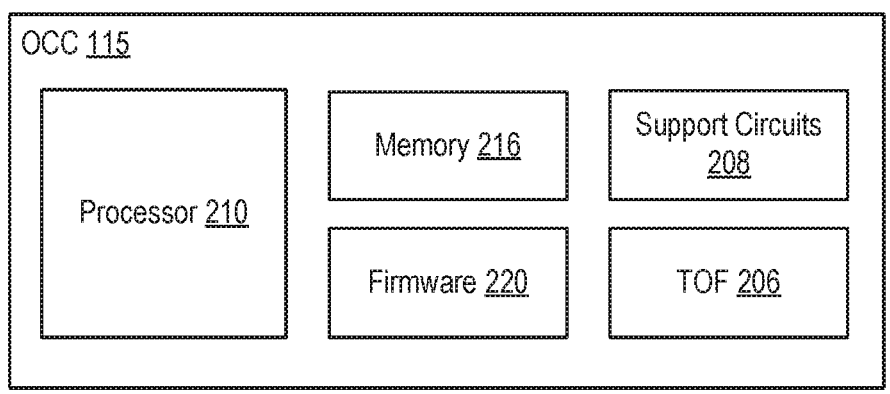
FIG. 2 is a block diagram depicting an on-chip controller according to an example.

FIG. 2 is a block diagram depicting the OCC 115 according to an embodiment. The OCC 115 includes a processor 210, a memory 216, firmware 220, support circuits 208, and a trace and optimize function (TOF) 206. The firmware 220 stores software of the OCC 115 in a nonvolatile memory. The processor 210 executes the firmware 220 and stores and retrieves data/code in the memory 216. The support circuits 208 include various interfaces to the devices in the system for obtaining measurements and for setting parameters (e.g., voltage, frequency, etc.). The TOF 206 is configured to assess the settings of the various devices in the system and to apply the settings to establish system characterization settings. The TOF 206 includes two modes of operation to support optimal system assurance testing. In a first mode (e.g., a trace mode), the TOF 206 is configured to obtain settings from the various devices as input and propagate the settings to other system components. In the trace mode, the TOF 206 processes responses from the various devices to determine a possible operating settings that account for various parameters, such as power, thermal, stress, coverage, traffic, and the like. In the second mode (e.g., an optimize mode), the TOF 206 is configured to determine final settings and propagate the final settings to the various devices to establish operating settings. In this manner, the TOF 206 synchronizes the operating settings across all devices. The TOF 206 can measure parameters of interest periodically and ensure that the parameters are attained or maintained. If not, the TOF 206 can notify that some control action is required to revisit existing settings and/or further optimizing the settings.

Figure 3:
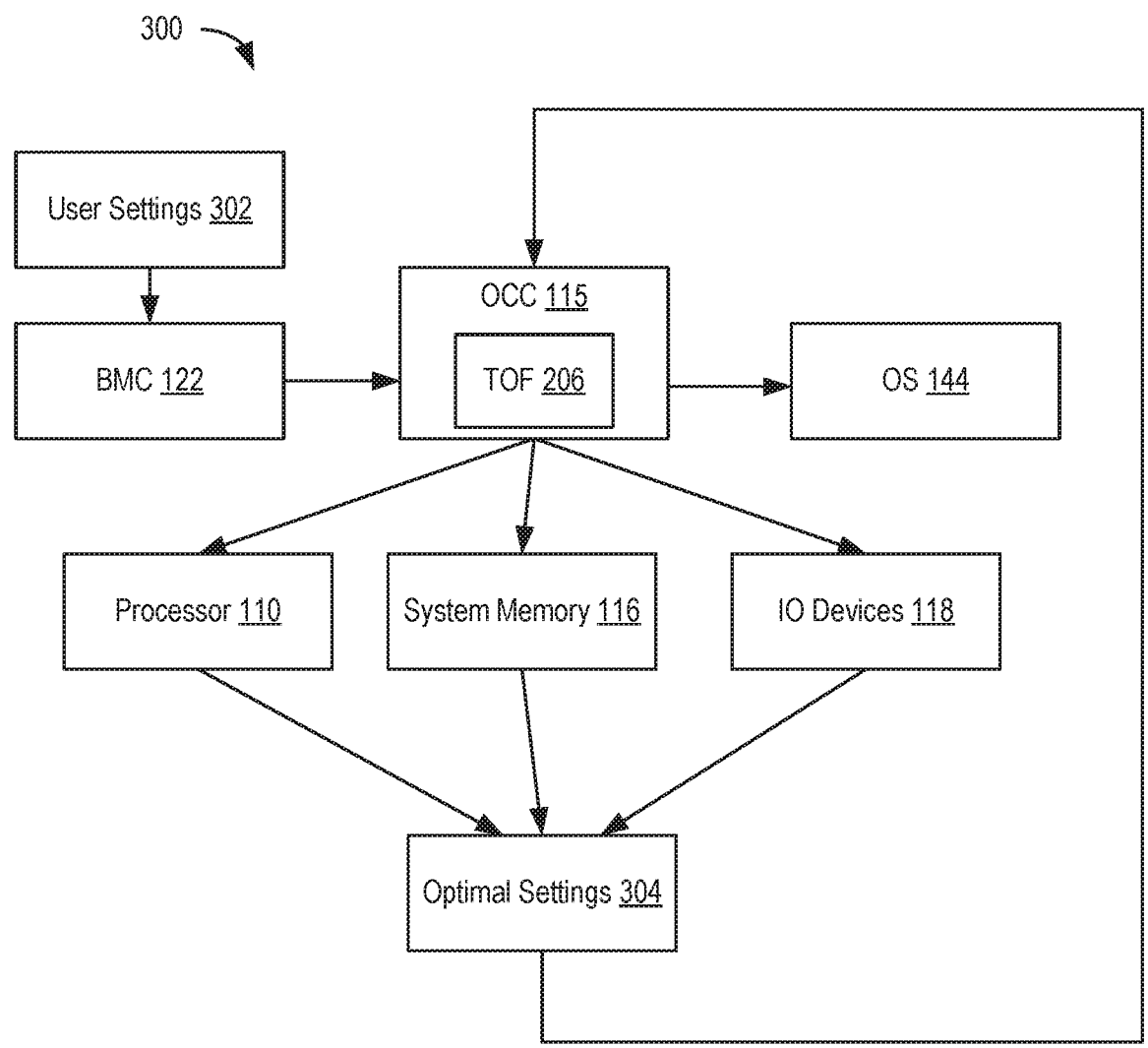
FIG. 3 is a flow diagram depicting a method of operation of a trace and optimize function controller (TOF) according to an embodiment.

FIG. 3 is a flow diagram depicting a method 300 of operation of the TOF 206 according to an embodiment. In the embodiment, the BMC 122 receives user settings 302. For example, the user can access the BMC 122 and provide various settings for controlling the devices in the system (e.g., power, frequency, etc.). During operation, the OCC 115 functions as described above to measure and control the devices. The TOF 206 is configured to first execute the trace mode and obtains settings from the devices (e.g., the processor 110, the system memory 116, the IO devices 118). The TOF 206 combines the retrieved settings to provide possible operating settings. The TOF 206 then enters the optimize mode, where the TOF 206 determines optimal settings 304 for the devices. The TOF 206 provides the optimal settings 304 to the OCC 115, which controls the devices accordingly (e.g., the processor 110, the system memory 116, the IO devices 118). The OCC 115 can communicate with the OS 144 to provide the optimal settings 304. In this manner, even if a device is controlled out-of-band by a particular utility, the out-of-band setting is considered by the TOF 206 and accounted for in the optimal settings 304. The TOF 206 prevents the OCC 115 from overriding such out-of-band settings, which may be employed during testing as described above.

Figure 4:
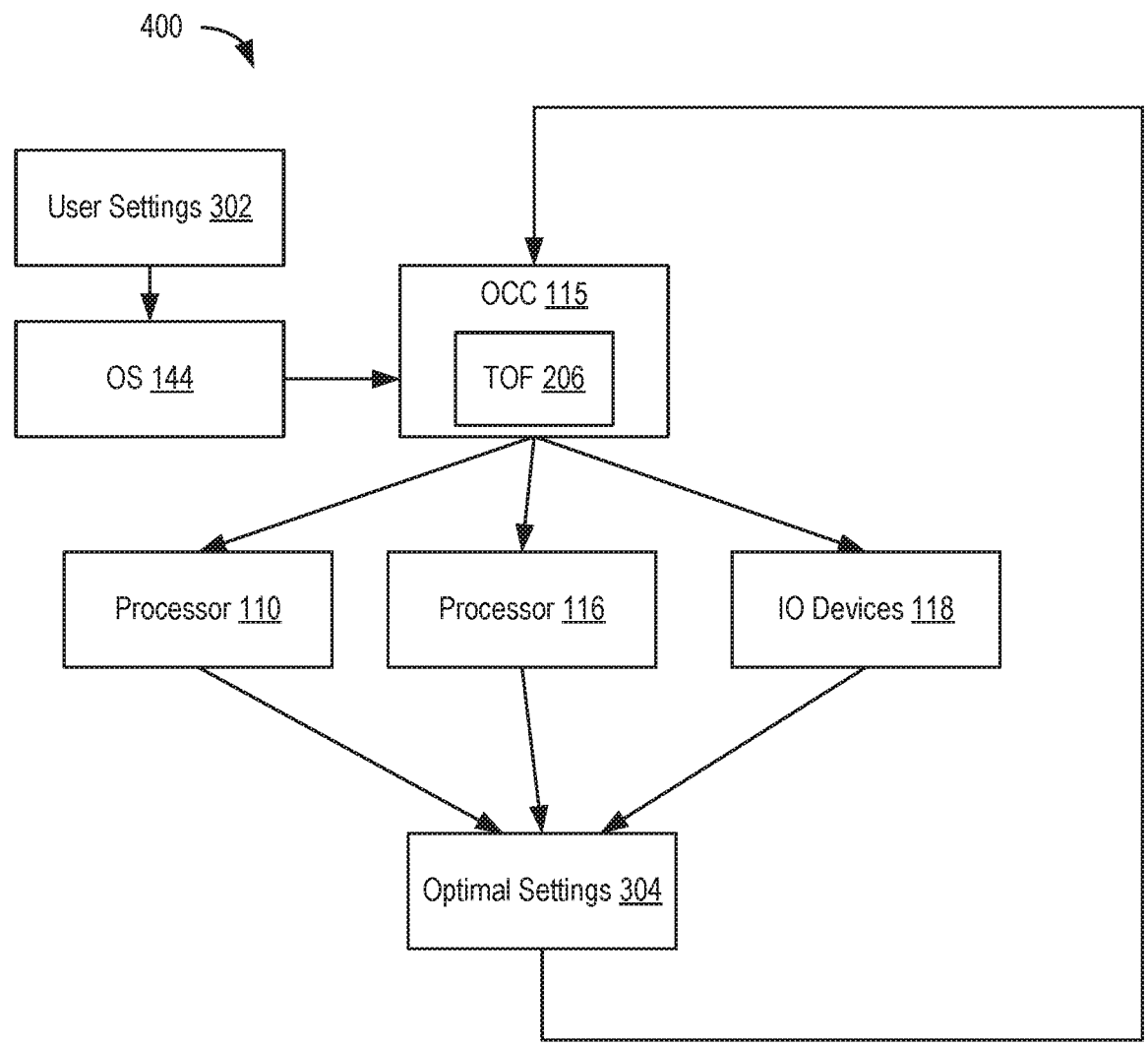
FIG. 4 is a flow diagram depicting a method of operation of a trace and optimize function controller (TOF) according to another embodiment.

FIG. 4 is a flow diagram depicting a method 400 of operation of the TOF 206 according to another embodiment. In the embodiment, the OS 144 receives the user settings 302. For example, the user can configure the OS 114 and provide various settings for controlling the devices in the system (e.g., power, frequency, etc.). During operation, the OCC 115 functions as described above to measure and control the devices. The TOF 206 is configured to first execute the trace mode and obtains settings from the devices (e.g., the processor 110, the system memory 116, the IO devices 118). The TOF 206 combines the retrieved settings to provide possible operating settings. The TOF 206 then enters the optimize mode, where the TOF 206 determines optimal settings 304 for the devices. The TOF 206 provides the optimal settings 304 to the OCC 115, which controls the devices accordingly (e.g., the processor 110, the system memory 116, the IO devices 118). In this manner, even if a device is controlled out-of-band by a particular utility, the out-of-band setting is considered by the TOF 206 and accounted for in the optimal settings 304. The TOF 206 prevents the OCC 115 from overriding such out-of-band settings, which may be employed during testing as described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A computer system, comprising:
   a hardware platform comprising a plurality of components including a processor, a system memory, and a plurality of input/output (IO) devices, the processor including a controller having a trace and optimize function controller (TOF), wherein at least one component of the processor, the system memory, and the plurality of IO devices is controlled by one or more out-of-band utilities, wherein the one or more out-of-band utilities provide out-of-band control settings to the at least one component; and
   a software platform including the one or more out-of-band utilities and an operating system (OS) executing on the hardware platform;
   wherein the TOF is configured to communicate with the processor, the system memory, the plurality of IO devices, and the one or more out-of-band utilities to obtain respective current settings thereof, wherein the obtained current settings comprise the out-of-band control settings for the at least one component, and to determine optimized final settings for the processor, the system memory, and the plurality of IO devices based on combining the obtained current settings, wherein the optimized final settings determined by the TOF prevent the controller from overriding the out-of-band control settings for the at least one component by the controller; and
   wherein the controller is configured to control the processor, the system memory, and the plurality of IO devices based on the optimized final settings.

2. The computer system of claim 1, wherein the hardware platform includes a baseboard management controller (BMC), and wherein the controller is configured to obtain user settings from the BMC.

3. The computer system of claim 1, wherein the controller is configured to obtain user settings from the OS.

4. The computer system of claim 1, wherein the TOF is configured to generate the optimized final settings based on the obtained current settings and user settings.

5. The computer system of claim 1, wherein the software platform includes one or more utilities configured to control one or more parameters of the hardware platform out-of-band with respect to the controller.

6. The computer system of claim 1, wherein the hardware platform includes voltage regulation modules (VRMs), and wherein the TOF is configured to communicate with the VRMs.

7. The computer system of claim 1, wherein the TOF is configured to monitor the hardware platform to determine whether the optimized final settings are being maintained.

8. A method of controlling devices in a computer system, the method comprising:
   communicating, by a trace and optimize function controller (TOF) in a controller of a hardware platform in the computer system, with a processor, a system memory, a plurality of input/output (IO) devices, and one or more out-of-band utilities on a software platform in the computer system, to obtain respective current settings thereof, wherein the computer system comprises a plurality of components, wherein the plurality of components includes the processor, the system memory, and the plurality of IO devices, wherein at least one component of the processor, the system memory, and the plurality of IO devices is controlled by the one or more out-of-band utilities, wherein the one or more out-of-band utilities provide out-of-band control settings to the at least one component, and wherein the obtained current settings comprise the out-of-band control settings for the at least one component;

determining, by the TOF, optimized final settings for the processor, the system memory, and the plurality of IO devices based on combining the obtained current settings, wherein the optimized final settings determined by the TOF prevent the controller from overriding the out-of-band control settings for the at least one component by the controller; and controlling, by the controller, the processor, the system memory, and the plurality of IO devices based on the optimized final settings.

9. The method of claim 8, wherein the hardware platform includes a baseboard management controller (BMC), and wherein the controller is configured to obtain user settings from the BMC.

10. The method of claim 8, wherein the controller is configured to obtain user settings from an operating system (OS) executing on the hardware platform.

11. The method of claim 8, wherein the TOF is configured to generate the optimized final settings based on the obtained current settings and user settings.

12. The method of claim 8, wherein the computer system includes the software platform comprising the one or more utilities configured to control one or more parameters of the hardware platform out-of-band with respect to the controller.

13. The method of claim 8, wherein the hardware platform includes voltage regulation modules (VRMs), and wherein the TOF is configured to communicate with the VRMs.

14. The method of claim 8, wherein the TOF is configured to monitor the hardware platform to determine whether the optimized final settings are being maintained.

15. A computer program product for controlling devices in a computer system the computer program product comprising:

a non-transitory computer-readable storage medium storing a plurality of computer program instructions, the computer program instructions executable by one or more computer processors to:

communicate, by a trace and optimize function controller (TOF) in a controller of a hardware platform in the computer system, with a processor, a system memory, a plurality of input/output (IO) devices, and one or more out-of-band utilities on a software platform in the computer system, to obtain respective current settings thereof, wherein the computer system comprises a plurality of components, wherein the plurality of components includes the processor, the system memory, and the plurality of IO devices, wherein at least one component of the processor, the system memory, and the plurality of IO devices is controlled by the one or more out-of-band utilities, wherein the one or more out-of-band utilities provide out-of-band control settings to the at least one component, and wherein the obtained current settings comprise the out-of-band control settings for the at least one component;

determine, by the TOF, optimized final settings for the processor, the system memory, and the plurality of IO devices based on combining the obtained current settings, wherein the optimized final settings determined by the TOF prevent the controller from overriding the out-of-band control settings for the at least one component by the controller; and control, by the controller, the processor, the system memory, and the plurality of IO devices based on the optimized final settings.

16. The computer program product of claim 15, wherein the hardware platform includes a baseboard management controller (BMC), and wherein the controller is configured to obtain user settings from the BMC.

17. The computer program product of claim 15, wherein the controller is configured to obtain user settings from an operating system (OS) executing on the hardware platform.

18. The computer program product of claim 15, wherein the TOF is configured to generate the optimized final settings based on the obtained current settings and user settings.

19. The computer program product of claim 15, wherein the computer system includes the software platform comprising the one or more utilities configured to control one or more parameters of the hardware platform out-of-band with respect to the controller.

20. The computer program product of claim 15, wherein the hardware platform includes voltage regulation modules (VRMs), and wherein the TOF is configured to communicate with the VRMs.

* * * * *